(12) United States Patent
Mori et al.

(10) Patent No.: US 9,376,998 B2
(45) Date of Patent: Jun. 28, 2016

(54) CONTROL DEVICE FOR VEHICLE

(71) Applicant: Nissan Motor Co., Ltd., Yokohama-shi, Kanagawa (JP)

(72) Inventors: Kouichi Mori, Ayase (JP); Hironobu Takahashi, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/375,808

(22) PCT Filed: Feb. 25, 2013

(86) PCT No.: PCT/JP2013/054680
§ 371 (c)(1),
(2) Date: Jul. 31, 2014

(87) PCT Pub. No.: WO2013/136953
PCT Pub. Date: Sep. 19, 2013

(65) Prior Publication Data
US 2015/0300308 A1    Oct. 22, 2015

(30) Foreign Application Priority Data

Mar. 15, 2012    (JP) ................................. 2012-058069

(51) Int. Cl.
| | | |
|---|---|---|
| *G05B 11/01* | (2006.01) |
| *F02N 11/10* | (2006.01) |
| *F02D 29/02* | (2006.01) |
| *F02N 11/08* | (2006.01) |
| *B60L 11/18* | (2006.01) |
| *B60L 15/20* | (2006.01) |

(Continued)

(52) U.S. Cl.
CPC ........... *F02N 11/101* (2013.01); *B60L 11/1851* (2013.01); *B60L 11/1864* (2013.01); *B60L 15/20* (2013.01); *B60R 16/033* (2013.01); *F02D 29/02* (2013.01); *F02N 11/006* (2013.01); *F02N 11/04* (2013.01); *F02N 11/0825* (2013.01); *F02N 11/0833* (2013.01); *F02N 11/0866* (2013.01); *F02N 11/108* (2013.01); *H01H 47/002* (2013.01); *F02D 2041/227* (2013.01); *F02N 2011/0892* (2013.01); *F02N 2200/061* (2013.01); *F02N 2250/02* (2013.01); *F02N 2300/2002* (2013.01); *Y02T 10/48* (2013.01); *Y02T 10/7258* (2013.01); *Y10S 903/907* (2013.01)

(58) Field of Classification Search
USPC ................. 701/22, 36; 74/7; 290/40 C, 38 A; 180/65.3, 65, 65.21, 65.22, 65.265, 180/65.28, 65.29, 65.285, 65.31; 307/66
See application file for complete search history.

(56) References Cited

U.S. PATENT DOCUMENTS 4,171,029 A * 10/1979 Beale ...................... B60K 6/105
                                                              180/54.1
4,307,450 A * 12/1981 Carp ...................... F02D 41/266
                                                              123/696

(Continued)

FOREIGN PATENT DOCUMENTS

DE    102007009527 A1    9/2007
JP         5-99103 A     4/1993

(Continued)

*Primary Examiner* — Ronnie Mancho
(74) *Attorney, Agent, or Firm* — Global IP Counselors, LLP

(57) ABSTRACT

A device for controlling a vehicle is configured to determine whether or not a relay is fixedly closed before a vehicle travels and after a driver operates an ignition, and the driving of a starter motor and an SSG motor is inhibited when the relay is determined to be fixedly closed.

11 Claims, 7 Drawing Sheets

(51) Int. Cl.
  *B60R 16/033* (2006.01)
  *F02N 11/00* (2006.01)
  *F02N 11/04* (2006.01)
  *H01H 47/00* (2006.01)
  *F02D 41/22* (2006.01)

(56) References Cited

U.S. PATENT DOCUMENTS

| | | | | |
|---|---|---|---|---|
| 4,998,200 | A | * | 3/1991 | Glowczewski ..... F16H 61/0206 477/131 |
| 2001/0041952 | A1 | * | 11/2001 | Nada ...................... B60K 6/445 701/22 |
| 2002/0113441 | A1 | * | 8/2002 | Obayashi .................. H02J 1/14 290/40 C |
| 2005/0082095 | A1 | | 4/2005 | Tamai et al. |
| 2007/0115604 | A1 | | 5/2007 | Zettel et al. |
| 2010/0251852 | A1 | * | 10/2010 | Murata ................ F02N 11/0844 74/7 A |
| 2011/0196570 | A1 | | 8/2011 | Nakamura |
| 2014/0001768 | A1 | * | 1/2014 | Moriya ............... F02N 11/0814 290/38 A |

FOREIGN PATENT DOCUMENTS

| | | |
|---|---|---|
| JP | 5-202834 A | 8/1993 |
| JP | 2003-254208 A | 9/2003 |
| JP | 2006-322362 A | 11/2006 |
| JP | 2007-240178 A | 9/2007 |
| JP | 2009-108733 A | 5/2009 |
| JP | 2010-77915 A | 4/2010 |

* cited by examiner

CONTROL DEVICE FOR VEHICLE

CROSS-REFERENCE TO RELATED APPLICATIONS

This application is a U.S. National stage application of International Application No. PCT/JP2013/054680, filed Feb. 25, 2013, which claims priority to Japanese Patent Application No. 2012-058069 filed in Japan on Mar. 15, 2012, the contents of each of which are hereby incorporated herein by reference.

BACKGROUND

1. Field of the Invention

The present invention relates to a device for controlling a vehicle.

2. Background Information

Japanese Laid-Open Patent Application No. 2009-108733 discloses an engine startup device having a main battery for supplying power to a motor capable of rotatably driving a crankshaft of an engine, a sub-battery for supplying power to electric components installed in the vehicle, and a relay installed between the sub-battery and the motor.

When the engine is started up by a driver operating the ignition in this conventional technology, a contact of the relay is closed to connect the sub-battery and the motor, and power is supplied to the motor from both the main battery and the sub-battery.

SUMMARY

In the conventional technology described above (i.e., an engine startup device), when the relay is stuck closed, there is a drop in voltage in the sub-battery accompanying the driving of the motor, and reliable working of the electric components cannot be guaranteed.

An object of the present invention is to provide a device for controlling a vehicle that can prevent the drop in voltage in the sub-battery that occurs when the relay is fixedly closed.

In the present invention, a determination is made as to whether or not a relay is fixedly closed after a driver has operated an ignition and before a vehicle begins to travel, and driving of the motor is inhibited when it is determined that the relay is fixedly closed.

Consequently, in the device for controlling a vehicle of the present invention, it is possible to prevent the drop in voltage in the sub-battery that occurs when the relay is fixedly closed.

BRIEF DESCRIPTION OF THE DRAWINGS

Referring now to the attached drawings which form a part of this original disclosure.

DETAILED DESCRIPTION OF EMBODIMENTS

Embodiment 1

Figure 1:
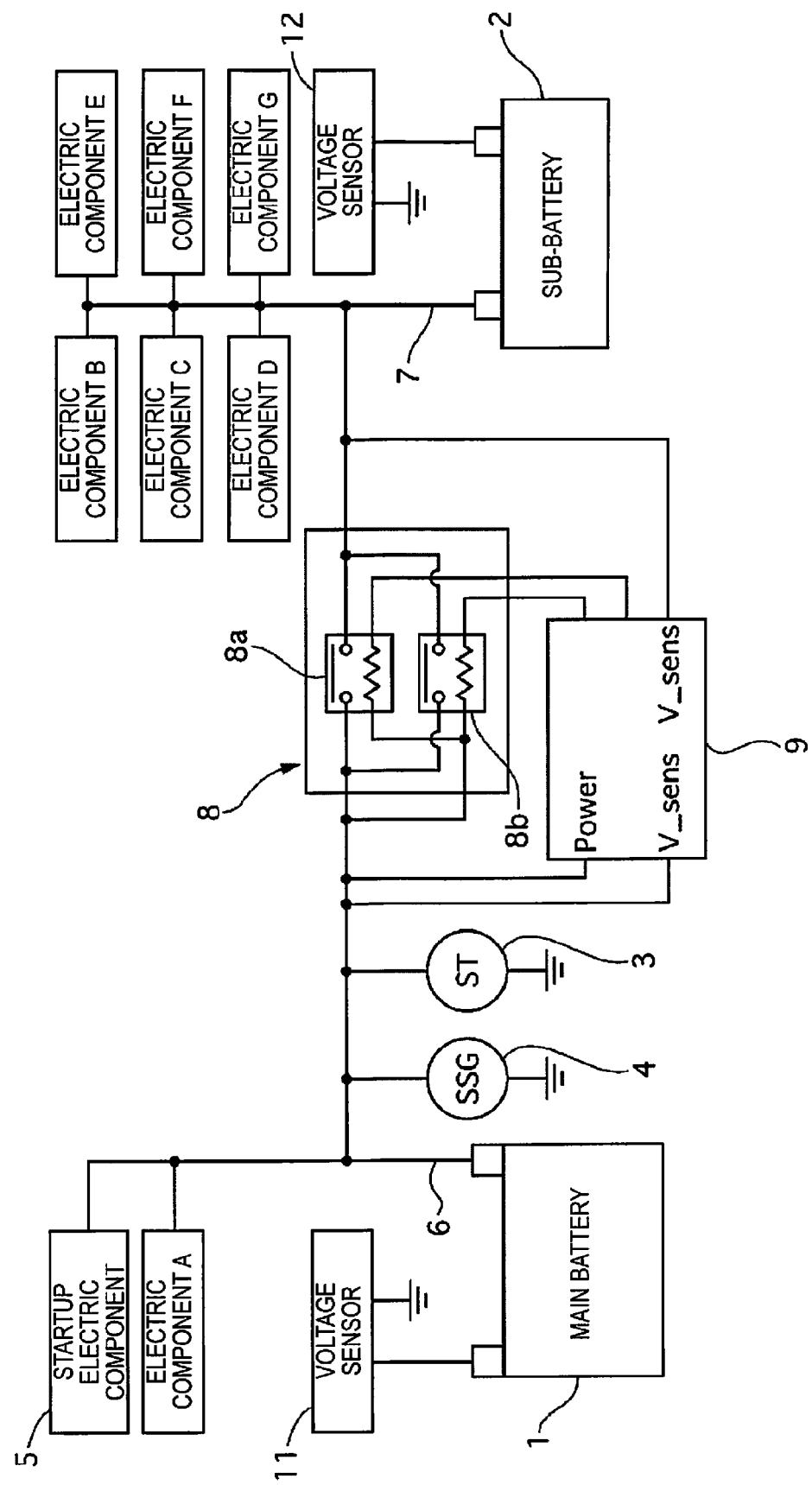
FIG. 1 is a system chart showing the power source system of the vehicle of Embodiment 1.

FIG. 1 is a system chart showing the power source system of the vehicle of Embodiment 1.

The vehicle of Embodiment 1 has a main battery 1 and a sub-battery 2 as a power source system. The main battery 1 and the sub-battery 2 are both common 14 V batteries used in existing vehicles.

The main battery 1 supplies power to a starter motor 3, a separated starter generator (SSG) motor 4, a startup electric component 5, and an electric component A via a main power source circuit 6.

The starter motor 3 is driven when the driver turns on a start switch (SW) for starting up the engine, i.e. during initial startup of the engine, and the starter motor rotatably drives a crankshaft of the engine to start up the engine.

The SSG motor 4, which is driven during engine restarting by idling stop control and coast stop control, rotatably drives the crankshaft of the engine to restart the engine. The idling stop control is a control that automatically stops the engine when a predetermined engine stopping condition is fulfilled while the vehicle is stopped, and afterward restarts the engine when a predetermined engine restart condition is fulfilled. The coast stop control is a control that automatically stops the engine when a predetermined engine stopping condition is fulfilled while the vehicle is coasting, and afterward restarts the engine when a predetermined engine restart condition is fulfilled.

Furthermore, in addition to functioning as a generator driven by the engine while the vehicle is traveling, the SSG motor 4 is also used in motor auxiliary drive control (torque assist control). The motor auxiliary drive control is a control used when the engine torque is insufficient for the drive force requested by the driver, and this control supplements the deficiency with the motor torque of the SSG motor 4. The motor auxiliary drive control is implemented primarily at times such as when the vehicle suddenly accelerates. The power generated by the regenerative operation of the SSG motor 4 is stored in the main battery 1 or the sub-battery 2.

The startup electric component 5 activates when the engine starts up or restarts.

The electric component A is an electric load that does not affect the traveling of the vehicle when the starter motor 3 or the SSG motor 4 is being driven, even if there is a drop in voltage in the main battery 1.

The sub-battery 2 supplies power to electric components B, C, D, E, F, G via a sub power source circuit 7. The electric components B to G are electric loads that do not affect the traveling of the vehicle when the starter motor 3 or the SSG motor 4 is being driven, even if there is a drop in voltage in the sub-battery 2, and possible examples of the electric components include an airbag control unit, a brake control unit, a power steering control unit, a navigation system, audio, various meters, and the like.

A relay circuit 8 is disposed between the main power source circuit 6 and the sub power source circuit 7. The relay circuit 8 is configured as a dual system from a first relay 8a and a second relay 8b. The relays 8a, 8b are relays having normally-open contacts, and are controlled by an engine control unit 9. The relays 8a, 8b are below referred to collectively as the relays 8 when there is no particular need to make a distinction.

The engine control unit 9 outputs a command to open contacts to the relays 8 when the starter motor 3 and the SSG motor 4 are being driven, and in other cases outputs a command to close contacts to the relays 8. This is because when the contacts of the relays 8 are closed, a large current is supplied from the sub-battery 2 when the starter motor 3 or the SSG motor 4 is being driven, whereby there is a large drop in voltage in the sub-battery 2 and reliable working of the electric components B, C, D, E, F, G cannot be guaranteed.

When the relays 8 are fixedly closed (fixed ON), a large current is supplied from the sub-battery 2 to the starter motor or the SSG motor 4 even when a command to open contacts is outputted dot the relays 8; therefore, there is a drop in voltage in the sub-battery 2 and reliable working of the electric components B, C, D, E, F, G cannot be guaranteed.

In view of this, the engine control unit 9 executes the fixed ON determination and the motor drive inhibition process shown below, with the aim of preventing the drop in voltage in the sub-battery 2 that occurs with the relays 8 being fixed ON.

Fixed ON Determination and Motor Drive Inhibition Process

Figure 2:
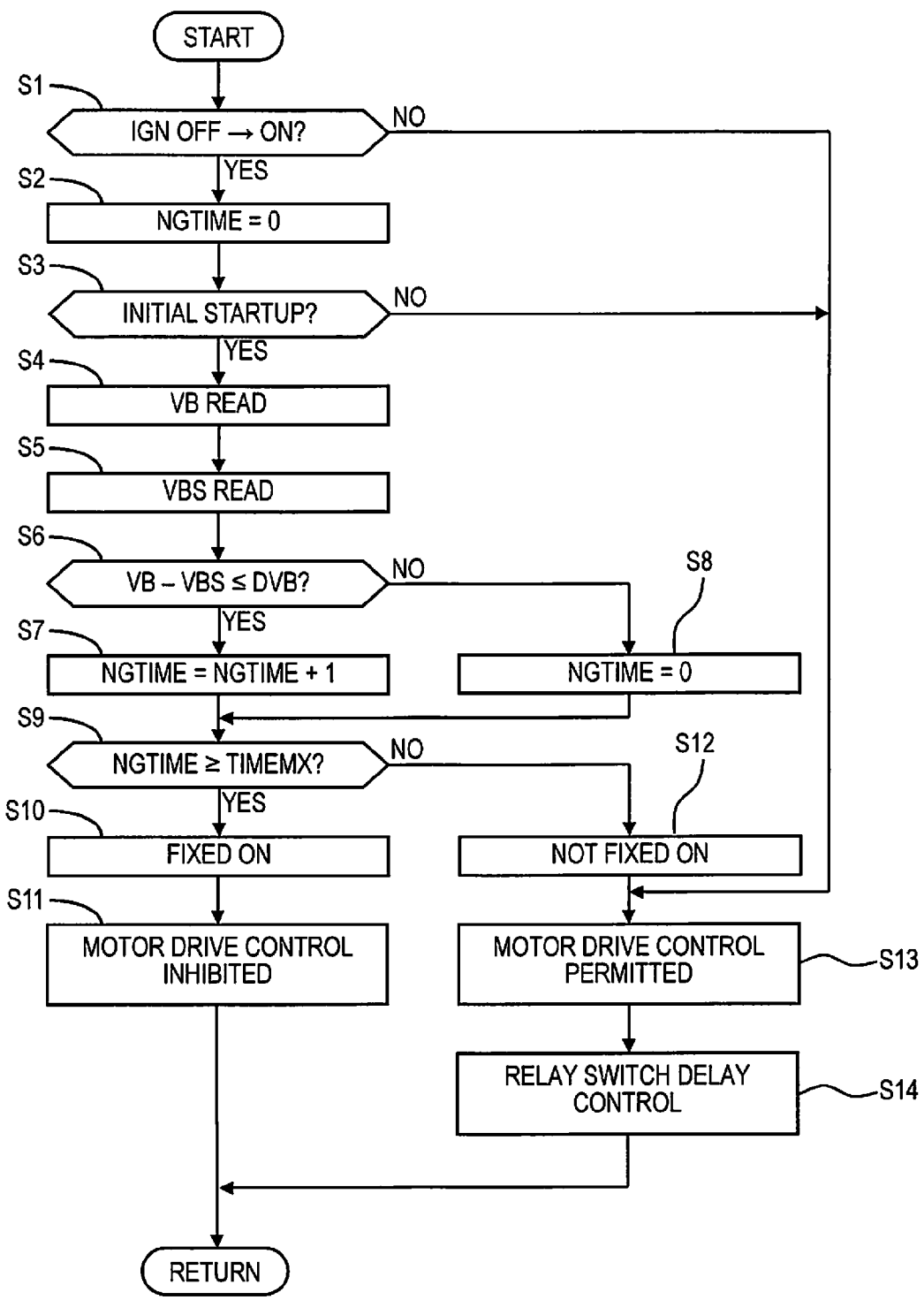
FIG. 2 is a flowchart showing the flow of the fixed ON determination and the motor drive inhibition process executed by the engine control unit of Embodiment 1.

FIG. 2 is a flowchart showing the flow of the fixed ON determination and the motor drive inhibition process executed by the engine control unit 9 of Embodiment 1, the steps of which are described below.

In step S1, a determination is made as to whether or not the ignition switch has been switched from OFF to ON, the process advances to step S2 when the determination is YES, and the process advances to step S13 when the determination is NO.

In step S2, a fixed ON determination timer NGTIME is reset.

In step S3, a determination is made as to whether or not the startup is an initial startup, the process advances to step S4 when the determination is YES, and the process advances to step S13 when the determination is NO.

In step S4, the voltage VB of the main battery 1 is read by a voltage sensor 11.

In step S5, the voltage VBS of the sub-battery 2 is read by a voltage sensor 12.

In step S6, a determination is made as to whether or not the voltage difference between the main battery voltage VB and the sub-battery voltage VBS is equal to or less than a predetermined voltage difference DVB, the process advances to step S7 when the determination is YES, and the process advances to step S8 when the determination is NO.

In step S7, the fixed ON determination timer NGTIME is counted up.

In step S8, the fixed ON determination timer NGTIME is reset.

In step S9, a determination is made as to whether or not the fixed ON determination timer NGTIME is equal to or greater than a predetermined time duration TIMEMX, the process advances to step S10 when the determination is YES, and the process advances to RETURN when the determination is NO.

In step S10, the relays 8 are determined to be fixed ON.

In step S11, the implementation of motor drive control (motor auxiliary drive control, idling stop control, coast stop control) is inhibited.

In step S12, the relays 8 are determined to not be fixed ON. Step S9, step S10, and step S12 are fixed ON determination means.

In step S13, implementation of motor drive control is permitted. Step S11 and step S13 are motor drive permission device.

In step S14, the relays 8 are switched from ON to OFF after a predetermined delay time duration has elapsed. The delay time duration is a time duration in which the main battery voltage VB can be determined to have returned to the voltage prior to the driving of the starter motor 3.

Next, actions will be described.

Figure 3:
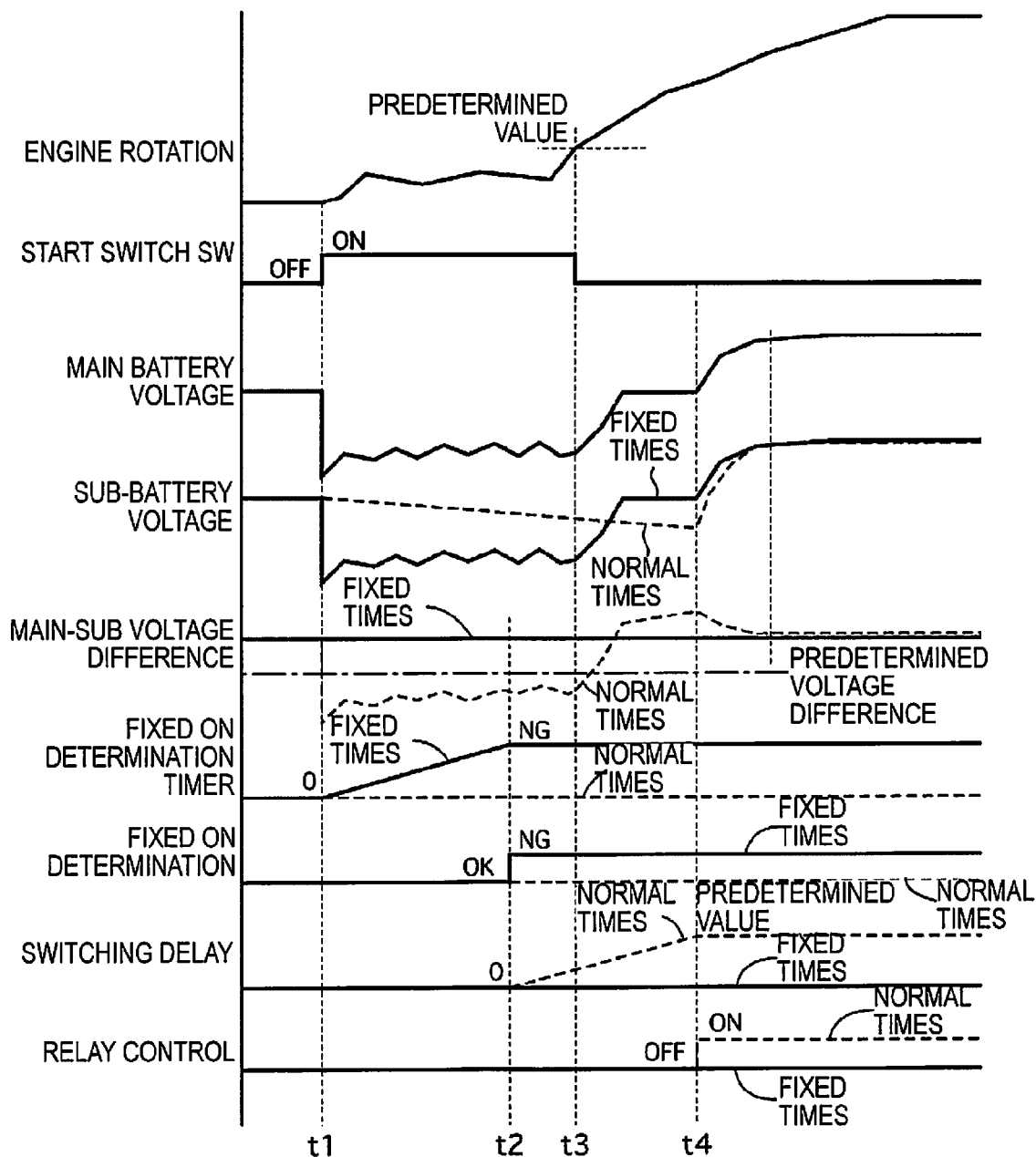
FIG. 3 is a time chart showing the fixed ON determination action of Embodiment 1.

FIG. 3 is a time chart showing the fixed ON determination action of Embodiment 1.

Normal Times

At time t1, the start switch SW is turned ON to supply power to the starter motor 3 from the main battery 1, and there is therefore a large drop in voltage in the main battery 1. Because the relays 8 are OFF at this time, there is no large drop in voltage in the sub-battery 2.

At time t2, the fixed ON determination timer NGTIME reaches the predetermined time duration TIMEMX. At this time, the relays are determined to not be fixed ON because the voltage difference between the main battery voltage VB and the sub-battery voltage VBS is greater than a predetermined voltage discrimination B.

At time t3, the engine rotational speed reaches a predetermined rotational speed, the starter motor 3 therefore stops, and the drop in voltage in the main battery 1 thereby becomes smaller.

At time t4, the relays 8 are switched from OFF to ON because a predetermined delay time duration has elapsed since time t2.

Fixed ON Times

When the relays 8 are fixed ON, at time t1, power is supplied to the starter motor 3 from the sub-battery 2, and there is therefore a large drop in voltage in the sub-battery 2, similar to the main battery 1.

At time t2, the fixed ON determination timer NGTIME reaches the predetermined time duration TIMEMX. At this time, the relays are determined to be fixed ON because the voltage difference between the main battery voltage VB and the sub-battery voltage VBS is equal to or less than the predetermined voltage discrimination DVB, and the implementation of motor drive control (motor auxiliary drive control, idling stop control, coast stop control) is inhibited.

When motor drive control is implemented while the relays 8 are fixed ON, the voltage necessary to reliably work the electric components B, C, D, E, F, G cannot be guaranteed due to the drop in voltage in the sub-battery 2 that occurs with the driving of the starter motor 3 and the SSG motor 4, and there is a risk that the traveling of the vehicle will be affected, such as the steering wheel or brake being difficult to manipulate.

In view of this, in Embodiment 1, the various motor drive controls for driving the starter motor 3 and the SSG motor 4 are inhibited when the relays 8 are fixed ON, whereby the drop in voltage in the sub-battery 2 that occurs with the relays 8 being fixed ON can be prevented, and reliable working of the electric components B, C, D, E, F, G can therefore be guaranteed.

In Embodiment 1, the relays 8 are determined to be fixed ON after the initial startup of the engine. Due to the fixed ON determination being made under the condition that the relays 8 should be OFF prior to travel, it is possible to prevent in advance motor drive control from being implemented during travel and the electric components B, C, D, E, F, G from ceasing to activate normally.

Furthermore, in Embodiment 1, the voltage difference between the main battery voltage VB and the sub-battery voltage VBS is compared, and the relays 8 are determined to be fixed ON when the voltage difference continues to be equal to or less than the predetermined voltage difference DVB for predetermined time duration. Because a large current flows to the starter motor 3 after the initial startup of the engine, when the relays 8 are not fixed ON, the drop in voltage in the main battery 1 is greater than the drop in voltage in the sub-battery 2. When the relays 8 are fixed ON, the drop in voltage in the sub-battery 2 is the same as the main battery 1, and the voltage difference is therefore approximately zero. Consequently, it is possible to precisely determine whether or not the relays 8 are fixed ON by comparing the voltage difference with the predetermined voltage difference DVB. Particularly, because a large current flows to the starter motor 3 during engine startup, the power state of the sub-battery 2 greatly varies when the relays 8 are fixed ON, and determining that the relays are fixed ON is easy.

Next, in the device for controlling a vehicle of Embodiment 1, the effects listed below are achieved.

(1) The device for controlling a vehicle comprises a main battery 1 for supplying power to a starter motor 3 and a SSG motor 4 capable of rotatably driving a crankshaft of an engine, a sub-battery 2 for supplying power to electric components B, C, D, E, F, G installed in the vehicle, relays 8 installed between the sub-battery 2 and the starter motor 3 and SSG motor 4, a fixed closed determination device (S9, S10, S12) for determining whether or not the relays 8 are fixed ON, and a motor drive permission device (S11, S13) for permitting the starter motor 3 and SSG motor 4 to be driven when the relays 8 are determined to not be fixed ON, and inhibiting the starter motor 3 and SSG motor 4 from being driven when the relays 8 are determined to be fixed ON; therefore, the drop in voltage in the sub-battery 2 that occurs with the sticking ON of the relays 8 can be prevented, and reliable working of the electric components B, C, D, E, F, G can be guaranteed.

(2) Because the fixed closed determination device determines that the relays 8 are fixed ON before the vehicle travels and after the driver operates an ignition, it is possible to prevent in advance motor drive control from being implemented during travel and the electric components B, C, D, E, F, G from ceasing to activate normally. Because a large current flows to the starter motor 3 during engine startup, the power state of the sub-battery 2 greatly varies when the relays 8 are fixed ON, and determining that the relays are fixed ON is easy.

(3) Because the fixed closed determination device determines that the relays 8 are fixed ON when the voltage difference between the main battery voltage VB and the sub-battery voltage VBS is equal to or less than a predetermined voltage difference DVB, it is possible to determine whether or not the relays 8 are fixed ON with greater precision.

Embodiment 2

Embodiment 2 differs from Embodiment 1 in that the fixed ON determination of the relays 8 is made during the engine restart of idling stop control.

Fixed ON Determination and Motor Drive Inhibition Process

Figure 4:
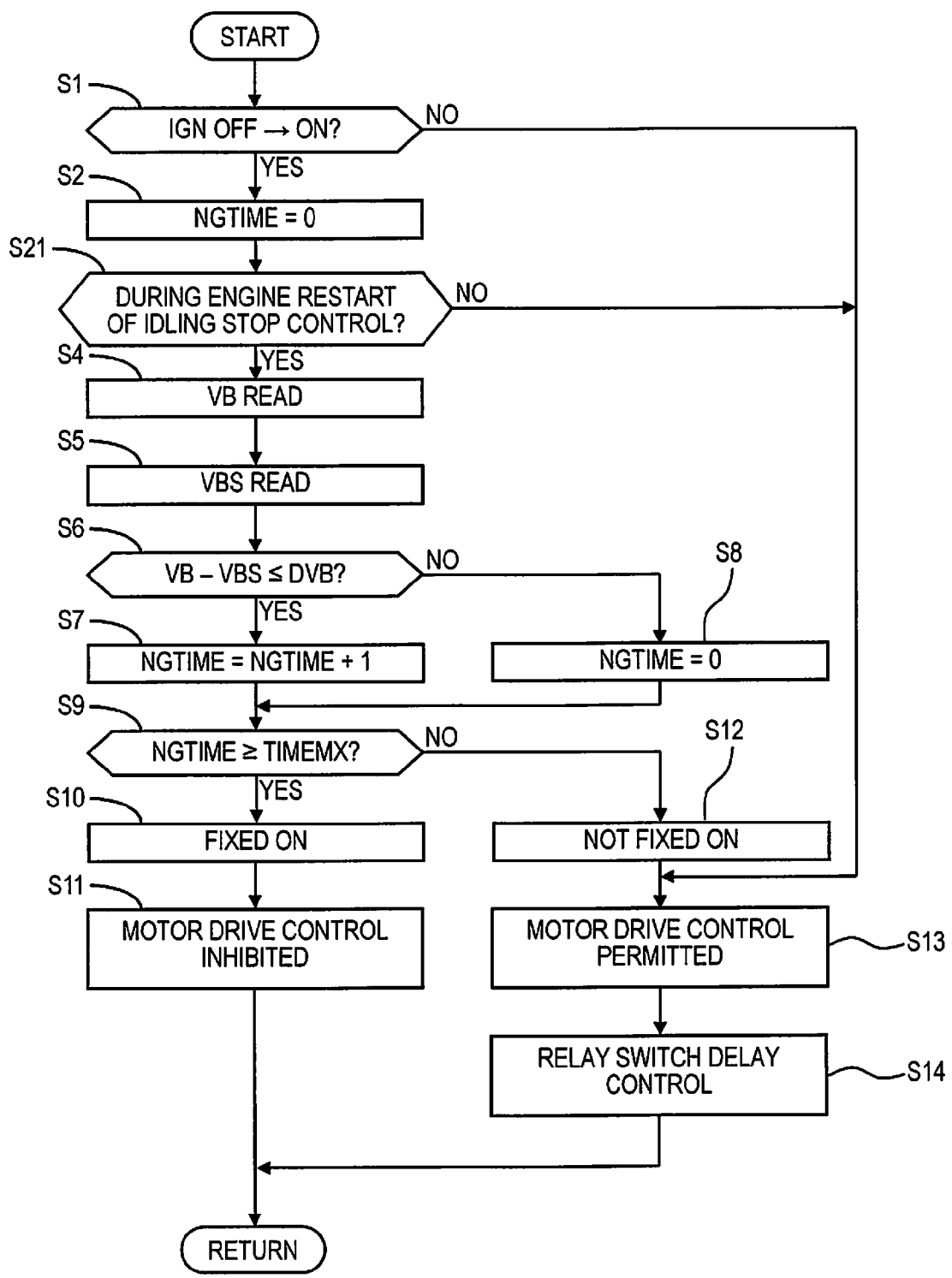
FIG. 4 is a flowchart showing the flow of the fixed ON determination and the motor drive inhibition process executed by the engine control unit of Embodiment 2.

FIG. 4 is a flowchart showing the flow of the fixed ON determination and the motor drive inhibition process executed by the engine control unit 9 of Embodiment 2, and only the step differing from Embodiment 1 shown in FIG. 2 is described below.

In step S21, a determination is made as to whether or not an engine restart of idling stop control is taking place, the process advances to step S4 when the determination is YES, and the process advances to step S13 when the determination is NO.

Next, the actions will be described.

Figure 5:
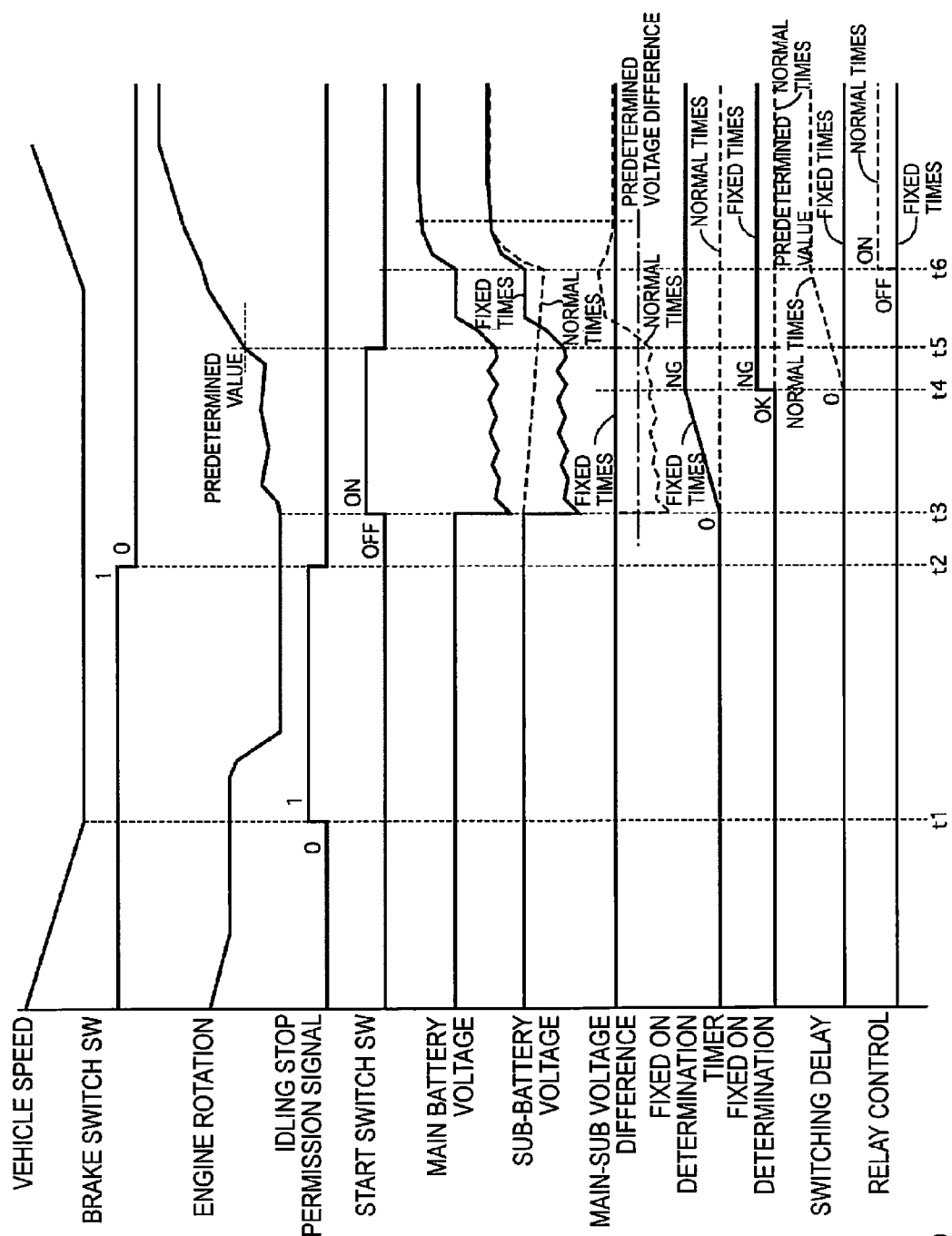
FIG. 5 is a time chart showing the fixed ON determination action of Embodiment 2.

FIG. 5 is a time chart showing the fixed ON determination action of Embodiment 2.

Normal Times

At time t1, because a predetermined engine stopping condition (brake switch ON) is fulfilled while the vehicle has stopped, idling stop control is initiated and the engine is stopped.

At time t2, a predetermined engine restart condition (brake switch OFF) is fulfilled.

At time t3, the start switch SW is turned ON and power is supplied from the main battery 1 to the SSG motor 4, and there is therefore a large drop in voltage in the main battery 1. At this time, there is no large voltage effect in the sub-battery 2 because the relays 8 are OFF.

At time t4 the fixed ON determination timer NGTIME reaches the predetermined time duration TIMEMX. At this time, the relays are determined to not be fixed ON because the voltage difference between the main battery voltage VB and the sub-battery voltage VBS is greater than the predetermined voltage discrimination DVB.

At time t5, the engine rotational speed reaches a predetermined rotational speed, the starter motor 3 therefore stops, and the drop in voltage in the main battery 1 thereby becomes smaller.

At time t6, the relays 8 are switched from OFF to ON because a predetermined delay time duration has elapsed since time t4.

Fixed on Times

When the relays 8 are fixed ON, power is supplied from the sub-battery 2 to the SSG motor 4 at time t3, and there is therefore a large drop in voltage in the sub-battery 2, similar to the main battery 1.

At time t4, the fixed ON determination timer NGTIME reaches the predetermined time duration TIMEMX. At this time, the relays are determined to be fixed ON because the voltage difference between the main battery voltage VB and the sub-battery voltage VBS is equal to or less than the predetermined voltage discrimination DVB, and the implementation of motor drive control (motor auxiliary drive control, idling stop control, coast stop control) is inhibited.

Consequently, in the device for controlling a vehicle of Embodiment 2, the following effects are achieved in addition to the effects (1) and (3) of Embodiment 1.

(4) The fixed closed determination device (S9, S10, S12) automatically stops the engine when the predetermined engine stopping condition is fulfilled while the vehicle has stopped, the relays 8 are afterward determined to be fixed ON during the engine restart of idling stop control for restarting the engine when the predetermined engine restart condition is fulfilled, and it is therefore possible to prevent in advance motor drive control from being implemented during travel and the electric components B, C, D, E, F, G from ceasing to activate normally. Because a large current flows to the SSG motor 4 during the engine restart, the power state of the sub-battery 2 greatly varies when the relays 8 are fixed ON, and determining that the relays are fixed ON is easy.

Embodiment 3

Embodiment 3 differs from Embodiment 1 in that the fixed ON determination of the relays 8 is made during motor auxiliary drive control.

Fixed ON Determination and Motor Drive Inhibition Process

Figure 6:
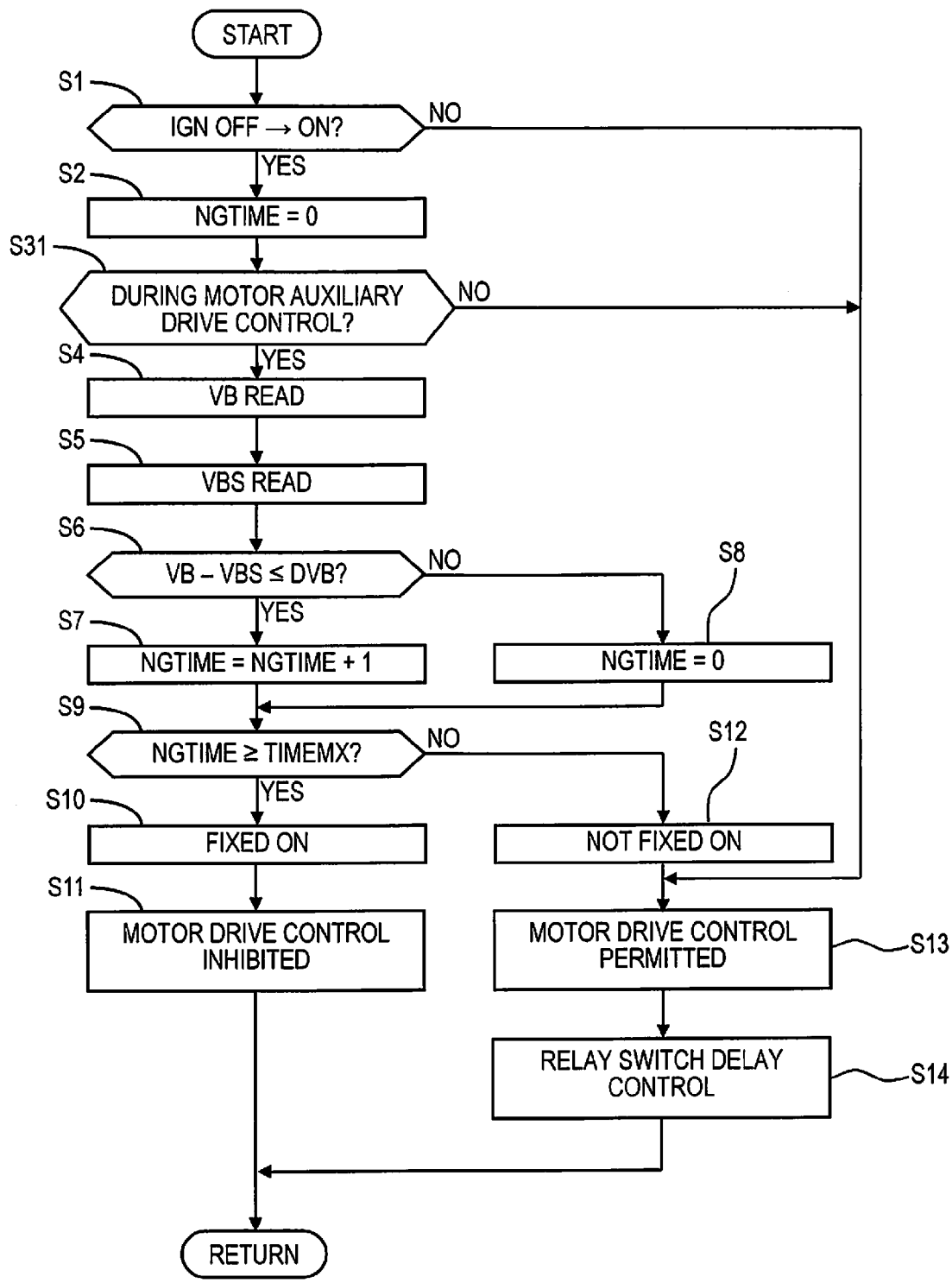
FIG. 6 is a flowchart showing the flow of the fixed ON determination and the motor drive inhibition process executed by the engine control unit of Embodiment 3.

FIG. 6 is a flowchart showing the flow of the fixed ON determination and the motor drive inhibition process executed by the engine control unit 9 of Embodiment 3, and only the step differing from Embodiment 1 shown in FIG. 2 is described below.

In step S31, a determination is made as to whether or not motor auxiliary drive control is taking place, the process advances to step S4 when the determination is YES, and the process advances to step S13 when the determination is NO.

Next, the actions will be described.

Figure 7:
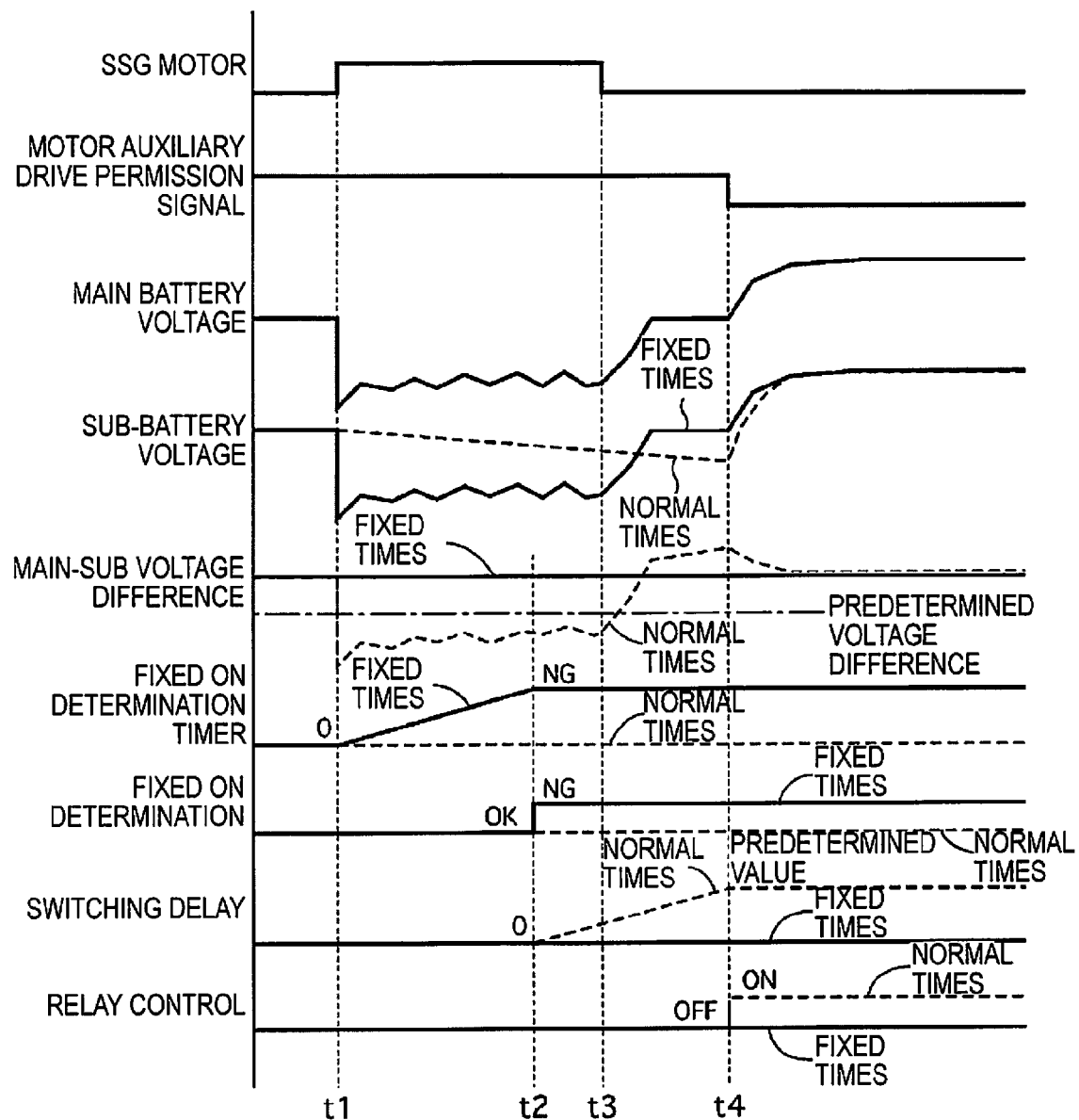
FIG. 7 is a time chart showing the fixed ON determination action of Embodiment 3.

FIG. 7 is a time chart showing the fixed ON determination action of Embodiment 3.

Normal Times

At time t1, the accelerator pedal is suddenly pressed, motor auxiliary drive control takes effect, power is supplied to the SSG motor 4 from the main battery 1, and there is therefore a large drop in voltage in the main battery 1. At this time, there is no large drop in voltage in the sub-battery 2 because the relays 8 are OFF.

At time t2, the fixed ON determination timer NGTIME reaches the predetermined time duration TIMEMX. At this time, the relays are determined to not be fixed ON because the voltage difference between the main battery voltage VB and the sub-battery voltage VBS is greater than the predetermined voltage discrimination DVB.

At time t3, the accelerator pedal becomes steady, the SSG motor 4 therefore stops, and the drop in voltage in the main battery 1 thereby becomes smaller.

At time t4, the relays 8 are switched from OFF to ON because a predetermined delay time duration has elapsed since time t2.

Fixed ON Times

When the relays 8 are fixed ON, power is supplied from the sub-battery 2 to the SSG motor 4 at time t1, and there is therefore a large drop in voltage in the sub-battery 2, similar to the main battery 1.

At time t2, the fixed ON determination timer NGTIME reaches the predetermined time duration TIMEMX. At this time, the relays are determined to be fixed ON because the voltage difference between the main battery voltage VB and the sub-battery voltage VBS is equal to or less than the predetermined voltage difference DVB, and the implementation of motor drive control (motor auxiliary drive control, idling stop control, coast stop control) is inhibited.

Consequently, in the device for controlling a vehicle of Embodiment 3, the following effects are achieved in addition to the effects (1) and (3) of Embodiment 1.

(5) Because the fixed closed determination device (S9, S10, S12) makes the fixed ON determination of the relays 8 while motor auxiliary drive control for driving the SSG motor 4 is being implemented, not only while the vehicle has stopped but while the vehicle is traveling as well, motor auxiliary drive control can be stopped immediately when the relays 8 are fixed ON. Because a large current flows to the SSG motor 4 during motor auxiliary drive control, the power state of the sub-battery 2 greatly varies when the relays 8 are fixed ON, and determining that the relays are fixed ON is easy.

Other Embodiments

Modes for carrying out the present invention are described above based on embodiments, but the present invention is not limited to these embodiments and includes other embodiments as well.

The embodiments presented examples in which the relays are determined to be fixedly closed when the voltage difference between the main battery voltage and the sub-battery voltage is equal to or less than a predetermined voltage difference, but another alternative is to determine that the relays are fixedly closed when the voltage of the sub-battery is equal to or less than a predetermined voltage or when the current of the sub-battery is equal to or greater than a predetermined current.

The invention claimed is:

1. A device for controlling a vehicle, comprising:
    a main battery configured to supply power to a motor capable of rotatably driving a crankshaft of an engine;
    a sub-battery configured to supply power to an electric component disposed in the vehicle;
    a relay disposed between the motor and the sub-battery;
    a fixed closed determination device configured to determine whether or not the relay is fixedly closed after an ignition of the vehicle is operated and before the vehicle begins to travel; and
    a motor drive permission device configured to permit the motor to be driven when the relay is determined to not be fixedly closed, and inhibit the motor from being driven when the relay is determined to be fixedly closed.

2. The device for controlling a vehicle according to claim 1, wherein
    the fixed closed determination is configured to determine that the relay is fixedly closed before the vehicle travels and after the driver operates an ignition.

3. The device for controlling a vehicle according to claim 1, wherein
    the fixed closed determination device is configured to automatically stop the engine when a predetermined engine stopping condition is fulfilled while the vehicle is stopped, and afterward determine the relay is fixedly closed during an engine restart of an idling stop control for restarting the engine when a predetermined engine restart condition is fulfilled.

4. The device for controlling a vehicle according to claim 1, wherein
    the fixed closed determination device is configured to determine that the relay is fixedly closed while torque assist control for driving the motor is being implemented, while the vehicle is stopped and while the vehicle is traveling.

5. The device for controlling a vehicle according to claim 1, wherein
    the fixed closed determination device is configured to determine that the relay is fixedly closed on the basis of the power state of the sub-battery.

6. The device for controlling a vehicle according to claim 2, wherein
    the closed determination device is configured to automatically stop the engine when a predetermined engine stopping condition is fulfilled while the vehicle is stopped, and afterward determine the relay is closed during an engine restart of an idling stop control for restarting the engine when a predetermined engine restart condition is fulfilled.

7. The device for controlling a vehicle according to claim 2, wherein
    the closed determination device is configured to determine that the relay is closed while torque assist control for driving the motor is being implemented, while the vehicle is stopped and while the vehicle is traveling.

8. The device for controlling a vehicle according to claim 3, wherein
    the closed determination device is configured to determine that the relay is closed while torque assist control for driving the motor is being implemented, while the vehicle is stopped and while the vehicle is traveling.

9. The device for controlling a vehicle according to claim 2, wherein the closed determination device is configured to determine that the relay is closed on the basis of the power state of the sub-battery.

10. The device for controlling a vehicle according to claim 3, wherein
the closed determination device is configured to determine that the relay is closed on the basis of the power state of the sub-battery.

11. The device for controlling a vehicle according to claim 4, wherein
the closed determination device is configured to determine that the relay is closed on the basis of the power state of the sub-battery.

* * * * *